United States Patent [19]

Merz et al.

[11] Patent Number: 5,304,590

[45] Date of Patent: Apr. 19, 1994

[54] ACRYLONITRILE POLYMER COMPOSITIONS AND ARTICLES AND METHODS FOR THEIR PREPARATION

[75] Inventors: Edmund H. Merz, Melbourne Beach, Fla.; Roy A. White, Somers, Conn.; John P. Fouser, San Francisco; Norman Fishman, Menlo Park, both of Calif.

[73] Assignee: Solcas Polymer, Inc., San Francisco, Calif.

[21] Appl. No.: 822,288

[22] Filed: Jan. 21, 1992

[51] Int. Cl.[5] .......................... C08F 20/44; C08J 9/12
[52] U.S. Cl. ..................... 524/235; 524/280; 524/566; 521/64; 521/73; 521/78; 521/79; 521/98; 264/81; 264/182; 264/211
[58] Field of Search ................ 524/280, 566, 235; 521/73, 64, 78, 79, 98

[56] References Cited

U.S. PATENT DOCUMENTS

| | | | |
|---|---|---|---|
| 2,851,434 | 9/1958 | Jones et al. | 524/280 |
| 3,268,490 | 8/1966 | Sunden et al. | 260/78.5 |
| 3,380,949 | 4/1968 | Isley et al. | 260/30.4 |
| 3,437,717 | 4/1969 | Isley et al. | 260/881 |
| 3,940,405 | 2/1976 | Serad | 260/29.6 |
| 4,066,731 | 1/1978 | Hungerford et al. | 264/216 |
| 4,144,299 | 3/1979 | Inoue et al. | 264/558 |
| 4,172,065 | 10/1979 | Parkinson et al. | 260/29.6 |
| 4,226,817 | 10/1980 | Siegman | 264/39 |
| 4,301,112 | 11/1981 | Zwick | 264/564 |
| 4,536,365 | 8/1985 | Zwick | 264/558 |
| 4,683,261 | 7/1987 | Inoue et al. | 524/566 |
| 4,743,417 | 5/1988 | Bakkelunn | 264/45.1 |
| 4,943,618 | 2/1990 | Stoy et al. | 525/340 |

FOREIGN PATENT DOCUMENTS

| | | |
|---|---|---|
| 73020176 | of 0000 | Japan . |
| 55-065236 | 5/1980 | Japan . |
| 57-139512 | 8/1982 | Japan . |
| 58-036208 | 8/1983 | Japan . |
| 58-174433 | 10/1983 | Japan . |
| 61-275309 | 12/1986 | Japan . |
| 62-062909 | 3/1987 | Japan . |
| 62-078209 | 4/1987 | Japan . |
| 62-085012 | 4/1987 | Japan . |
| 63-145345 | 6/1988 | Japan . |
| 72757 | 2/1981 | Romania . |
| 71507 | 10/1982 | Romania . |
| 80053 | 11/1982 | Romania . |
| 83256 | 9/1984 | Romania . |
| 95683 | 10/1988 | Romania . |

OTHER PUBLICATIONS

Jul. 27, 1993 Search Report from PCT International Application No. PCT/US93/00508.

*Primary Examiner*—Paul R. Michl
*Assistant Examiner*—Olga Asinovsky
*Attorney, Agent, or Firm*—Burns, Doane, Swecker & Mathis

[57] ABSTRACT

Process of mixing a fugitive plasticizer, e.g., ethylene carbonate, with moist particulate polyacrylonitrile then removing the water enabling adjustment of the melt viscosity for extrusion of the polyacrylonitrile into film, fiber, pellets and shaped articles. Stretching and heating the extruded polyacrylonitrile film or fiber causes the fugitive plasticizer to exude and vaporize from the film or fiber, carrying with it any remaining acrylonitrile monomer. The resulting film or fiber exhibits substantially increased molecular weight, thus enhancing the tensile strength and barrier properties of the polyacrylonitrile product. The process also produces polyacrylonitrile foam products. A novel cross-linking agent for polyacrylonitrile, divinyloxybutane, is disclosed. Thermostabilizing agents for polyacrylonitrile, N-maleimides and stilbene derivatives, are also disclosed.

20 Claims, 1 Drawing Sheet

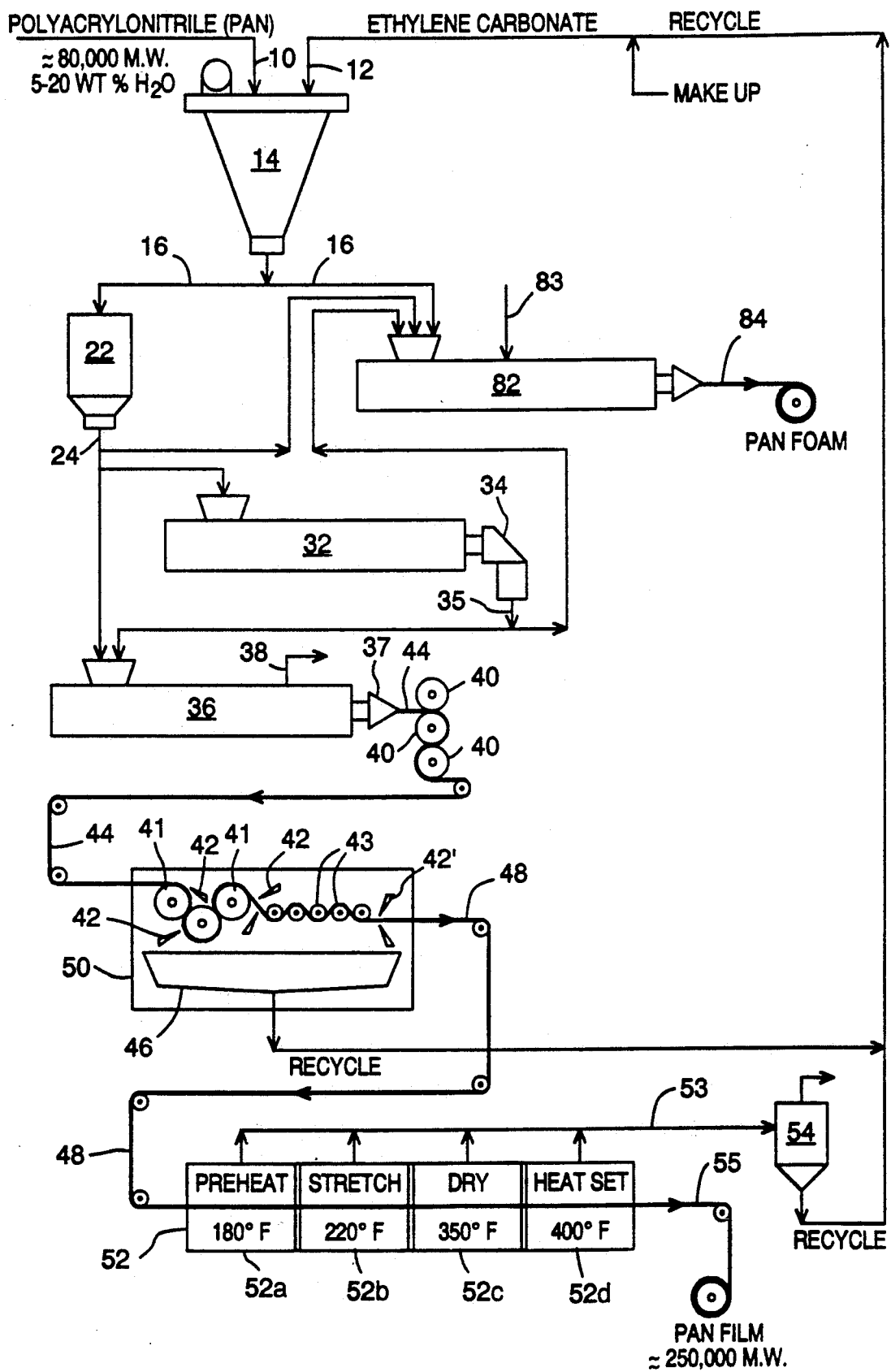

ACRYLONITRILE POLYMER COMPOSITIONS AND ARTICLES AND METHODS FOR THEIR PREPARATION

FIELD OF THE INVENTION

This invention relates to compositions of acrylonitrile polymers and to the processing and use of the compositions for the formation of films, particularly barrier films, fibers, co-extruded articles and foams.

BACKGROUND OF THE INVENTION

It has long been recognized that acrylonitrile polymers, and co-polymers containing acrylonitrile, produce films, fibers and other articles having desirable properties. Such products of particular interest are barrier films for use in product packaging. It has also long been recognized that certain aspects of polyacrylonitrile ("PAN") products need to be improved. First, there is a need for improved and easier processing. Secondly, there is a need for improved and more complete removal of the unreacted acrylonitrile monomer during processing of the polyacrylonitrile, because the presence of monomer is undesirable in food and drug packaging products. Thirdly, there is a need to improve the barrier properties of acrylonitrile polymers and co-polymers. Fourthly, it is desirable that strength properties, particularly tensile strength, of acrylonitrile polymers and co-polymers be increased.

Acrylonitrile polymers composed of 90 weight percent or more of acrylonitrile monomer are generally not melt processable. When heated, they char before the melt can be processed at temperatures commonly used in plastics processing equipment.

Shaped articles made from such polymers are presently limited to the production of fibers by dissolving such polymers in a polar solvent, forcing the resulting "syrup" through a spinnerette to form fibers, coagulating them in a heated atmosphere (dry spinning) or in a fluid bath (wet spinning), tensilizing by stretching, and drying by heat volatilization. Solvent vapors are condensed, purified and reused. Such processing is termed "solution" or "solvent" casting.

Experimental acrylonitrile homopolymer and co-polymer thin films have been made by solution casting as described in U.S. Pat. No. 3,437,717 to Isley et al. A melt extrusion blown film process is disclosed in U.S. Pat. No. 4,536,365 to Zwick, and in U.S. Pat. No. 4,144,299 to Inoue et al. Another melt reaction-extrusion process utilizing a water leaching system to remove the solvent component prior to biaxially stretching such formed film is described in U.S. Pat. No. 4,066,731 to Hungerford. Film property data taken from such acrylonitrile films show them to have many desirable mechanical, physical, chemical and electrical values for multipurpose use applications. Such films are clear, tough, resistant to ultraviolet radiation, have good temperature resistance, provide high barrier to gas and moisture transmission, and have good dimensional stability.

It appears that as the level of acrylonitrile monomer in such films is increased relative to other monomers, property values also increase. This is especially true of a 99.6 percent acrylonitrile monomer content polymerized with a polyalkenyl monomer serving as a cross-linking agent, as in U.S. Pat. No. 3,437,717. It is also apparent that a small amount of cross-linking agent incorporated into a polyacrylonitrile polymer for solution spinning filaments, yarns and fibers significantly enhances the properties of such end products, as disclosed in U.S. Pat. No. 3,268,490 to Sunden, et al. Conversely, the presence of minor amounts, as little as 1 to 2 percent, of comonomers can frequently reduce the desirable characteristics of the polyacrylonitrile product to a point that little advantage is gained over competitive polymer products.

Among the undesirable aspects of these polyacrylonitrile films is that the level of unpolymerized acrylonitrile monomer can exceed the 0.1 parts per million now allowed under United States Food and Drug Administration regulations. Other undesirable aspects relate to levels of residual and possibly toxic solvent, and the implications associated with packaging of food and drug products, and the higher costs and hazards of recovering, condensing, purifying and storing the volumes of solvent required.

The acrylonitrile polymer having the highest barrier and other property values in a biaxially stretched film is the type of polymer found in U.S. Pat. Nos. 3,437,717 and 3,380,949 to Isley et al., composed of 99.6 weight percent acrylonitrile monomer, as well as in U.S. Pat. No. 3,268,490 to Sundun et al., including copolymers composed of 85 weight percent acrylonitrile monomer. However, the molecular weight of these polymers increases after polymerization, thus causing decreasing rates of dissolution from 17 weight percent to less than 5 weight percent in the solvent system over the course of just 15 days from the date of polymerization. This indicates polymer instability. It is felt that these are major factors which have prevented such experimental films from becoming commercial products.

The disclosures of the above referenced patents are incorporated herein by reference.

Thus, it is an object of this invention to provide improved methods of processing polyacrylonitrile and to provide improved and new PAN compositions and products. This objective, as well as other desirable objectives, are achieved by the invention described and claimed herein.

SUMMARY OF THE INVENTION

This invention provides a method of preparing acrylonitrile polymers comprising 90 weight percent or more of acrylonitrile monomer, producing stabilized polymers in which molecular weight increases are prevented while in storage after preparation, drying such polymers to a moisture content of from 5 weight percent to about 30 weight percent under low temperature conditions which prevent the onset of thermal degradation of the polymer, and removing substantially all unpolymerized acrylonitrile monomer.

Another aspect of this invention provides a method of mixing moist particulate acrylonitrile polymers with a liquid fugitive plasticizing agent and other desired additives, dehumidifying such mix to a moisture content of less than 0.5 weight percent, fusing the dry blend in a compounder/extruder and forming pellets or precursor-shaped articles for re-extrusion, oriented film, fiber, foam and coextrusions with other polymers.

A further aspect of this invention provides a method of extracting about one-half of the liquid fugitive plasticizing agent from the polyacrylonitrile extrudate during the initial product forming and processing steps, then removing the remaining plasticizing agent to the desired level during subsequent processing steps, including stretching, biaxial orientation, heat treatment, heat volatilization of the plasticizer, and the like.

An additional aspect of this invention provides polyacrylonitrile products having an extremely low unpolymerized acrylonitrile monomer content as a result of heat volatilization of the fugitive plasticizing agent in the processing of the formed polymer product, wherein the monomer is carried out of the polymer by the volatilizing fugitive plasticizing agent.

An additional aspect of this invention provides for the increase of the polyacrylonitrile molecular weight for increased tensile strength and other properties. It is believed that biaxial orientation processing steps and/or heat treatment processing steps provide establishment of mechanical alignment of the molecular chains within the polymer, extension of chain lengths within the polymer and/or networking or entanglement of molecular chains within the polymer, thereby establishing precrystalline domains within the polymer structure.

In another aspect, this invention provides a method of making an extrudable polymer comprising polyacrylonitrile, which method comprises the steps of forming a free-flowing particulate polymer comprising polyacrylonitrile having from about 5 to about 30 percent by weight water or other absorption aid in the particulate polymer, mixing a liquid fugitive plasticizer with the particulate polymer whereby the plasticizer is uniformly absorbed in the particulate polymer particles, then removing substantially all of the water or other absorption aid from the particulate polymer mixture, thereby leaving the plasticizer absorbed in the particulate polymer. The liquid fugitive plasticizer is uniformly, completely and totally absorbed into the polymer, i.e., excess, unabsorbed plasticizer is not allowed to remain in the particulate polymer mix. Instead of or in addition to the water, other absorption aids for the plasticizer can be used, such as lower alkyl alcohols. In one preferred aspect, substantially all of the water is removed from the polymer-plasticizer mix, so that the polymer can be extruded at elevated temperatures without the evolution of steam. The dried plasticized polymer can be extruded to form pellets, films, fibers or shaped products. The pellets can be used for re-extrusion to form desired polyacrylonitrile products.

In another aspect of this invention, the dried plasticized polyacrylonitrile is extruded to form thin films or fibers, whereby upon the initial heating and stretching of the film or fiber, a significant portion of the fugitive plasticizer exudes from the polyacrylonitrile film or fiber and is collected from the surface of the film or fiber for recycle. In a further preferred aspect, the film or fiber is subjected to further stretching and/or heating during which further exudation and removal of additional amounts of plasticizer occurs. Thus, the final polyacrylonitrile film or fiber can be produced according to this invention having the desired amount of plasticizer remaining in film or fiber to provide varied physical properties of the final product.

In another aspect, the plasticized acrylonitrile polymer containing the water or other absorption aid can be extruded at conditions appropriate to form a foamed polyacrylonitrile product. In a preferred aspect of this method of the invention, the polymer mix containing the plasticizer can be dried to remove a portion of the water or other absorption aid, but leaving a sufficient amount in the mix so that when the polymer is extruded at the elevated temperature, the water or other absorption aid is vaporized to act as the blowing agent. Alternatively, the plasticized polymer can be dried to remove substantially all of the water or other absorption aid. Then, when the polymer is extruded, conventional blowing agents, such as carbon dioxide, pentane, and the like, can be introduced into the extruder to provide the desired foamed polyacrylonitrile product.

In another aspect, this invention provides a novel copolymer of acrylonitrile monomer and a polyalkenyl monomer, wherein the copolymer is formed by the process described above, and wherein a final heating step is employed, after the final polymer product has been formed, to increase the molecular weight of the copolymer in the final polymer product by at least about 50 percent of its molecular weight when the polymer product is initially formed by extruding or other means.

BRIEF DESCRIPTION OF THE DRAWING

The drawing illustrates various preferred aspects of the methods of this invention.

DETAILED DESCRIPTION OF THE INVENTION

The principles of the various basic aspects of the present invention can be understood by reference to certain preferred embodiments of this invention illustrated in the drawing. In reference to the drawing, a free-flowing, particulate acrylonitrile polymer having a molecular weight of about 80,000 and a moisture content of about 5 to about 30 percent by weight, preferably about 10 to 20 percent, is charged via inlet 10 to mixer 14. A fugitive plasticizer, e.g., ethylene carbonate, is charged to mixer 14 via inlet 12 in an amount of about 30 to 50 percent by weight bond based on the weight of the polymer, preferably about 35 to 45 weight percent. A preferred method of facilitating the mixing of the ethylene carbonate with the particulate polymer in mixer 14 is to melt the ethylene carbonate and charge it to mixer 14 and to the particulate polymer mixture in liquid form through an atomizing nozzle to thereby aid in the even distribution of the ethylene carbonate throughout the polymer particles. If the plasticizer is charged to the mixer as a solid or powder, the mixer should be operated at a temperature sufficient to melt the plasticizer in situ to enable the plasticizer to be uniformly absorbed throughout the polymer particles.

After the ethylene carbonate and polymer particles are sufficiently mixed, the resulting mixture 16 is charged to dryer 22 where the water is removed at relatively low temperatures. For example, the dryer can operate at about 150° F. (about 65° C.) at atmospheric pressure or can operate at about 125° to about 130° F. (about 52° C. to 54° C.) under a vacuum. It is important to maintain the operation of the dryer at a sufficiently low temperature so that the acrylonitrile polymer does not char or degrade. It is generally desirable for production of film, fiber, etc., to reduce the moisture content of the acrylonitrile polymer particles to about 0.5 percent by weight moisture, or less. It is important to note that in the drying operation the ethylene carbonate does not volatilize with the water but remains absorbed in the particulate polymer.

The dried, plasticized particulate acrylonitrile polymer 24 is compounded and processed in extruder 32, which is fitted with a pelletizing die 34 to produce polymer pellets 35 for storage and re-extrusion into various products. Alternatively, the dried, plasticized acrylonitrile particulate polymer 24 may be directly fed to extruder 36, which is fitted with a die according to the desired end product to be produced. In this embodiment illustrated in the drawing, extruder 36 is fitted with a slot die 37 to produce a flat web 44 having a thickness of 16 mils (0.016 inches) (0.04 cm) controlled by the gauge rolls 40. The extruder may be equipped with vent 38 to allow the removal of residual moisture and vapors. In this embodiment illustrated in the drawing, the polymer mixture 24 can contain about 35 to about 45 weight percent ethylene carbonate based on the weight of the polymer. Whether such polymer mixture 24 is fed into extruder 32 for pelletizing, or into extruder 36 for direct feed to form a continuous web for film, extruders 32 and 36 should contain staged heat zones ranging from about 175° F. (80° C.) to about 300° F. (149° C.). The polymer melt rheology may be adjusted by altering the ratio of plasticizer to polymer, until the required rheology is achieved at the most desired temperature at the exit die 34 for pellets, or slot die 37 to form web 44. The pellet or web product is quench cooled upon exiting die 34 or die 37, respectively, to avoid any degradation or undesired molecular weight increase of the polymer.

Web 44 then enters the machine direction orientation (MDO) machine 50, where the web is stretched. Web 44 first passes betwen warm-up rolls 41, having temperatures of from about 180° F. (82° C.) to about 220° F. (104° C.) to facilitate the machine direction stretching in the series of stretch rolls 43. As the web 44 is heated to its proper temperature on rolls 41, about one-half of the fugitive plasticizer exudes as a liquid from the surface of the web, and is removed from the web surface by suitable means, such as air knives 42, which direct the flow of such plasticizer into receptacle 46 for recovery and recycle with appropriate purification. If the plasticizer cools and solidifies on the surface of the web, it can be removed therefrom as a powder and similarly collected for recycle. In some instances, additional plasticizer exudes during stretching on rolls 43 and can be similarly removed and collected by air knives 42. Typically the MDO stretch is about 4 to 1.

The machine direction stretched web 48 then enters the transverse direction orientation (TDO) machine and oven 52, which is divided into separate heating and treatment zones 52a, 52b, 52c and 52d. Each heating zone temperature is set to accomplish its specific task. Since web 48 has been reduced in thickness of web 44 to about one-fourth of the original extruded thickness due to machine direction stretching in 50, i.e., about 4 mils (0.004 in. or 0.01 cm) complete heat penetration to the core of the film web occurs quickly and efficiently in preheat oven zone 52a. After the web is preheated in zone 52a, the web enters tenter frame zone 52b where its edge areas are gripped by clips fastened to two opposing continuously moving chains which travel apart from each other to effect a cross-wise stretching action on the web to the degree desired. Such chains are a part of a tentering frame apparatus inside zone 52b. As the film is stretched transversely, it becomes thinner. In stretch zone 52b, final desired film thickness is produced. A typical TDO stretch ratio is about 4 to 1, which in this case produces a film of about 1 mil (0.001 in. or 0.0025 cm). Plasticizer within the film volatilizes from the film with the increasing temperature of heat zone 52c at 350° F. (177° C.), at which temperature substantially all remaining plasticizer in the film is volatilized as vapor in the oven.

A still higher temperature is used in heat zone 52d to fully volatilize any remaining plasticizer from the film. In such volatilization of plasticizer from the film, any unpolymerized acrylonitrile monomer which may have remained in the polymer up to this point, will have been dissolved by the plasticizer and volatilized with the vaporized plasticizer. In TDO oven 52 all volatiles are collected through manifold vapor duct 53, then collected in a vapor condenser/recovery unit for subsequent purification and recycle to mixer 14. This aspect of the present invention enables the production of PAN film or fiber with extremely low or negligible unpolymerized monomer content. It is possible to remove essentially all traces of unpolymerized acrylonitrile monomer using this process, thereby producing a high purity PAN film acceptable for the most stringent packaging requirements.

Upon exiting TDO oven 52, the biaxially stretched film 55 is quickly quench cooled, edge trimmed, and rolled up onto standard roll cores.

Alternatively, time-temperature histories in oven heat zones 52c and 52d may be adjusted so that some residual plasticizer is left in the film, to provide desired properties for secondary thermoforming, for ultrasonic welding, or for other use applications that do not require high barrier or low monomer properties. In other uses, such as information storage media (computer tapes and floppy discs), audio tapes, photographic media, and the like, it may be desired to have a plasticizer level in the film of about 0.5 to 5 percent, preferably about 1 or 2 percent, to provide appropriate mechanical properties and surface properties, such as bonding sites for the respective media coating binder.

In the embodiment shown in the drawing, the preferred acrylonitrile polymer used is one which undergoes molecular weight increase through chain extension, whereby a lattice structure is formed and crystalline domains are established within the polymer structure in the finished film 55. Molecular weight increases from the original 80,000 to over 230,000 have been observed, which impart increased tensile and dimensional stability properties, improved gas and moisture barrier properties, and elevated flex crack resistance.

In understanding the basic operation of the preferred embodiment of the present invention, it is important to note that the plasticizer is mixed with the polyacrylonitrile containing the above mentioned amount of moisture, whereby the moisture functions as an absorption aid to cause the plasticizer to be absorbed totally and uniformly into each polymer particle thereby providing a uniform distribution of such plasticizer throughout the plasticizer/polymer mixture. It is also essential to thereafter remove all but about 0.5 percent or less of the moisture from such plasticizer/polymer mixture, to eliminate the formation of excess steam and consequent bubbles or defects within the extrudate pellets 35 or web 44 during their formation from extruders 32 or 36, respectively.

In another aspect of this invention, a polyacrylonitrile foam product 84 is produced as illustrated in the drawing. The plasticizer/polymer mixture 16 can be processed directly in extruder 82, without drying such mixture. In this embodiment, the temperature in extruder 82 generates steam from the moisture present, which acts as a blowing agent for the production of PAN foam 84. As the polymer melt exits extruder 82 at the elevated temperature of about 300° F. (149° C.), the steam pressure causes the acrylonitrile polymer melt to expand, thereby resulting in the formation of a cellular structure with biaxially oriented cell walls, thus forming a cellular PAN foam. In this aspect of this invention, it will be apparent to one skilled in the art that the moisture content and the plasticizer content of the polyacrylonitrile mixture 16 entering extruder 82 can be adjusted over a wide range to provide the polyacrylonitrile foam product 84 having the final physical properties desired. It will also be apparent that the foam product can be made in various thicknesses and dimensions as is conventionally practiced in producing extruded polymeric foams. Alternatively, the moisture can be removed from the plasticized polymer 16 before use in extruder 82, i.e., polymer 24 from dryer 22 and/or polymer 35 from pelletizer 34 can be used in extruder 82. In such embodiments, a conventional blowing agent, such as $CO_2$, pentane, etc., can be added to extruder 82 through inlet 83 to produce PAN foam 84. It is equally apparent that a portion of the moisture can be removed from polymer mix 16 and the steam supplemented with a conventional blowing agent added through port 83 to produce a variety of PAN foams having desired characteristics and properties.

As used herein, the term "particulate polymer comprising polyacrylonitrile" is to be understood to include homopolymer polyacrylonitrile, copolymers of acrylonitrile, block copolymers, graft copolymers, etc., which contain a significant portion of acrylonitrile polymerized or copolymerized in the polymer system. Monomers which can be included in the polymers useful as chain extenders and cross-linking agents are polyalkenyl monomers having at least two vinyl groups per molecule, including butanediol-1,4-divinyl ether, divinyl benzene, and the like. Monomers which can be employed to form copolymers of acrylonitrile useful in this invention include acrylate esters, such as methyl acrylate, ethyl acrylate, butyl acrylate, and the like; and methacrylate esters such as methyl methacrylate, ethyl methacrylate, butyl methacrylate, and the like.

The "absorption aid" used to facilitate the mixing and absorption of the liquid fugitive plasticizer into the particulate polymer is usually water. However, other absorption aids include the lower aliphatic alcohols such as methyl alcohol and ethyl alcohol, which may be used alone or in combination with water. Other materials may be used as absorption aids so long as the material properly functions to facilitate the absorption of the plasticizer into the polymer particles completely and uniformly. In addition, the absorption aid must then be capable of essentially complete (at least for most film and fiber production) removal from the plasticized polymer at temperatures and conditions which do not degrade the polymer or remove the plasticizer from the polymer.

The amounts of absorption aid used in the polymer should be between about 3 percent and about 30 percent by weight based on the weight of the polymer. Preferably, the range is about 5 percent to about 20 percent by weight, and more preferably about 10 to about 15 percent by weight based on the weight of the polymer. The amount will vary depending on the particular polymer or copolymer, absorption aid, plasticizer and the desired end product being produced.

The plasticizer employed in this invention is referred to as a "liquid fugitive plasticizer" because its function is to readily absorb uniformly into the polymer, remain in the polymer during processing, then readily separate from the extruded product which is formed, such as film, sheet, web, fibrils and co-extruded layers or laminates with other polymers. Such separation is accomplished by the elevated temperatures used throughout the product forming processes. It is believed that stretching to some extent also causes or assists in such separation. The plasticizers useful in the polymers mentioned above include ethylene carbonate and propylene carbonate either alone or in combination with each other. In addition, acetonitrile, used with either ethylene carbonate or propylene carbonate or a mixture thereof, is useful as a low boiling plasticizer which rapidly volatilizes at relatively low process temperatures, and is used with such carbonates at from about 10 to about 50 weight percent based on the weight of the carbonate(s), preferably about 20 to about 30 weight percent.

The liquid fugitive plasticizer must be one which can be uniformly, completely and intimately absorbed throughout the particulate acrylonitrile polymer with the assistance of the absorption aid. Thus, the plasticizer must be in liquid form at mixing temperatures to enable the plasticizer to penetrate uniformly through the particulate polymer for absorption therein. A plasticizer which is not liquid at mixing temperatures may be used if it can be placed in fluid form in a solvent or co-solvent for mixing. The solvent or co-solvent can then be removed with the absorption aid. Preferably, the plasticizer is liquid while in use in the polymer, i.e., at processing temperatures, and is liquid when separated from the polymer product. The plasticizer must be capable of remaining in the polymer when the absorption aid (water and/or alcohol) is removed from the plasticized polymer mix. In some instances, such as with acetonitrile, it may be appropriate to mix in one plasticizer, such as a carbonate, remove the absorption aid, such as water, then mix in a second, more volatile plasticizer, such as acetonitrile. This avoids the problem of the acetonitrile being removed with the absorption aid, such as water. The acetronitrile will mix with and be absorbed into the dry polymer due to the presence of the first plasticizer. The plasticized polymer can then be processed according to this invention, where the more volatile plasticizer, such as acetonitrile is quickly removed from the extruded film or fiber, then the less volatile plasticizer, such as a carbonate, is then removed with further heating and/or mechanical action.

Finally, the plasticizer should be readily separable from the final formed polymer product to the desired degree by heat treatment and/or mechanical treatment, such as disclosed herein. Thus, the plasticizer should not volatilize at the temperatures and conditions for absorption aid removal, but should exude, liquify or volatilize at temperatures and conditions for processing and treatment of the formed PAN products. Of course, a more volatile second plasticizer which is mixed in the polymer mix after removal of the absorption aid will generally be easily separable from the final polymer product to the degree desired.

One skilled in the art will be able to select appropriate liquid fugitive plasticizers for use in this invention based on the criteria described above and following the embodiments and examples disclosed herein.

The amount of plasticizer(s) used can generally range from about 20 percent to about 60 percent by weight based on the weight of the polymer, preferably about 30 percent to about 50 percent and more preferably about 35 to about 45 percent. It has been found that with ethylene carbonate a wide range of polymer melt viscosity can be obtained by small adjustments of the amount of plasticizer within the preferred 35 to 45 percent range.

Having illustrated the present invention in the drawing described above, other more general aspects and some more particular aspects of this invention can now be described.

Polymers useful in this invention include acrylonitrile polymers comprising 90 weight percent or more acrylonitrile monomer polymerized with a polyalkenyl monomer having at least two vinyl groups per molecule. In a preliminary step, it is desirable to render such polymers substantially free of unpolymerized acrylonitrile monomer by separating such polymer product from the polymerizing solution and subsequent washing solutions which may contain stabilizing agents and other agents, such as antioxidants. These separations should be at low temperatures. An important aspect of this invention involves leaving or providing a sufficient amount of moisture in the polymer so that in blending or mixing a plasticizing agent with the polymer, the plasticizing agent is drawn in to the polymer particles by the moisture present in the particles. Then, the removal of substantially all moisture enables the fusing of the dry polymer blend in an extruder to create dry, uniform pellets which can be re-extruded into shaped articles such as thin films, co-extrusions with other polymers, foam and fibers. This invention further provides for removing substantially all of the plasticizing agent from the shaped articles by mechanical and heat volatilization means. Of course, the dry polymer blend can be directly extruded into the shaped article instead of first forming pellets. Instead of drying the polymer after blending the plasticizer, the polymer blend containing the water can be extruded, so that the steam acts as a blowing agent to directly produce a polyacrylonitrile foam.

This invention provides not only thin films and fibers that can be effectively prepared from acrylonitrile polymers composed of 90 weight percent or more of acrylonitrile monomer by melt fusion on standard equipment at standard production rates, but the processes of this invention can be used to produce foams and coextrusions with other polymers for the production of shaped containers. This invention enables reduced levels of unpolymerized acrylonitrile monomer in such final polymer products to well within the limits now imposed by regulatory agencies. This invention provides such polymers with means for stabilization from continued molecular weight increase prior to melt fusion, thus enabling long-term storage. This invention involves methods of uniformly impregnating particulates of such polymers with plasticizing agents. Additionally, an effective method is provided to remove moisture from particulate dry blends of such polymers and plasticizers after utilizing such moisture as an absorption aid for getting the plasticizing agent uniformly absorbed into the polymer particles.

This invention further provides a mechanical means, such as during stretching, tentering and the like, for extracting large portions of the plasticizing agent from the shaped articles produced, thus leaving reduced volumes of plasticizing agent to be subsequently volatilized by heat treatment. In a preferred aspect, the invention provides plasticizing compounds whose content can be regulated to enable the melt viscosity to be tailored to the requirements for certain shaped articles to emanate from the processes of this invention. For example, by selecting a particular plasticizing compound or combination of plasticizing compounds and selecting the amount of plasticizing compound absorbed into the polymer, a wide range of melt viscosity can be achieved in the polyacrylonitrile as desired for processing through extruders and other equipment. Likewise, the particular plasticizing compound and the amount thereof can be selected to produce the final film, fiber, foam or other polyacrylonitrile product having the end use properties suitable for that particular product. For instance, when ethylene carbonate is used as the plasticizing compound, small changes in the amount of ethylene carbonate absorbed into the particulate polymer can produce a wide range of melt viscosity in the polymer. For ethylene carbonate the melt viscosity of the acrylonitrile polymer can be adjusted over a wide range merely by varying the amount of ethylene carbonate present from 35 percent by weight to about 45 percent by weight. Similarly, when propylene carbonate is used as the plasticizing compound the melt viscosity of the polymer can also be changed as desired by incorporating acetonitrile with the propylene carbonate as well as varying the amount of each component used in the polymer. It will be apparent to one skilled in the art following the teachings therein how to adjust the selection and amount of plasticizing compounds used in the polymer to provide not only the desired melt viscosity for processing, but also the characteristics and properties of the final product produced.

A preferred acrylonitrile polymer in the present process is a polymer composed of 99.6 weight percent of acrylonitrile monomer polymerized with 0.4 weight percent polyalkenyl monomer having at least two vinyl groups per molecule, as more fully described in U.S. Pat. No. 3,437,717, to Isley et al. to provide a polymer having a molecular weight of from 80,000 to 100,000. Similarly, the acrylonitrile polymers produced as described in U.S. Pat. No. 3,268,490 to Sunden et al. are among the most preferred acrylonitrile polymers used in the present invention. These preferred polymers are produced by methods which polymerize primarily by chain extension rather than by primarily cross-linking between chains. These polymers are also known as "star" configuration polymers in which polymerization is by chain extension from a "seed" nucleus. The term "star" configuration refers to a molecular morphology that results from chains growing outward in several directions from a nucleus, in this case formed by copolymerization of acrylonitrile monomer with the polyalkenyl monomer having at least two vinyl groups per molecule. This preferred type of polymer for use in the present invention is referred to as a chain extension polymer having a low degree of cross-linking. It is apparent from the prior art that these preferred polymers can be produced in particulate form. The present invention is equally effective for copolymers, block copolymers and graft copolymers of acrylonitrile.

Polymerization of acrylonitrile is carried out in an aqueous medium under a nitrogen blanket in a straight forward manner as by emulsion or suspension means well-known to those skilled in the art, in the presence of an emulsifier and a redox catalyst. Polymerization can be accomplished either in the batch or continuous mode. All of the polyalkenyl monomer can be added to the polymerizing agents, but the first addition of acrylonitrile monomer is carried out as a "seed step", wherein up to about 2 weight percent of the total acrylonitrile monomer is first copolymerized with the polyalkenyl monomer, followed by addition of the remainder of the acrylonitrile monomer in a continuous manner, incrementally or all at once. High conversion rates of polymer are normal in such reactions. This type of polymer preparation produces "chain-extended" polymers having a low degree of cross-linking. Poly-merization of such polymers is described more fully in U.S. Pat. No. 3,380,949 to Isley et al. The disclosures of the above patents are incorporated herein by reference.

It should be noted that in the above referenced Isley et al. and Sunden et al. patents, various polyalkenyl monomers are disclosed for use in the polymerization of acrylonitrile, such as butanediol-1,4-divinylether, divinyl benzene and the like. We have found a particularly effective polyalkenyl monomer which has not been recognized in the prior art as useful in acrylonitrile polymerization. We have found that when divinyloxybutane, copolymerized with acrylonitrile monomer is used instead of the butanediol-1,4-divinylether (as disclosed in Example I), polymerization runs smoothly and a polyacrylonitrile having high levels of desirable properties is produced.

The particulate product of polymerization is isolated and collected by filtration, centrifugation, spray drying or other suitable low temperature means. For use in the present invention, it is essential to wash such polymers in a series of aqueous baths to remove all polymerizing agents by means well-known to those skilled in the art, and it is desirable to also remove unpolymerized acrylonitrile monomer to levels below 0.1 parts per million to meet regulatory requirements. Such particulate polymers have a surface area in the range of 10 to 50 square meters per gram, thus they are extremely porous and moisture absorptive. It is therefore also essential that the final rinse solution contain an antioxidant compound to stabilize such polymers by correcting possible defects introduced into the polymers such as ketonitrile groups formed by oxygen attack of the polymer backbone chains, or by nitrile group hydrolysis during polymerization. It is further essential that from about 3 to about 30 weight percent, preferably from about 5 to about 20 weight percent of the final rinse water remain in such polymers to assist the penetration and impregnation of the plasticizing agent into the polymer particles. Other desirable additives, such as ultraviolet inhibitors, coloring agents, flame retardants and the like, can also be added during the dry blending procedures with the plasticizing agents. Acrylonitrile polymers prepared in this manner are in the form of a finely divided white powder, which is free-flowing even at these moisture content levels.

Acrylonitrile polymers useful in the present process may be thermally fused by incorporating polar plasticizing agents dry blended into the polymers at levels of from 30 to 60 weight percent, with a preferred range of 35 to 50 weight percent. Ethylene carbonate, a non-toxic, medium to high boiling point, colorless compound performs well as a single component plasticizing agent in the present invention. We have also found that ethylene carbonate and acetonitrile in proportions ranging from about 9:1 to about 1:1, preferably ranging from about 4:1 to about 2:1, weight ratio mixtures, also plasticize such polymers effectively for use in this invention, while increasing the rate of plasticizer removal from shaped articles according to this invention, due to the higher volatility of the acetonitrile. In the practice of the present invention, the wide useful range of proportions of polymer to plasticizing agent permit a high degree of flexibility in selecting the proper polymer melt viscosity for optimum thermoplastic forming of shaped articles.

Dry blending of the particulate polymers with plasticizing agents embodied herein may be carried out in various types of mixing equipment. We have found that a conical mixer such as a J. H. Day Nauta II model fitted with a jacket for steam heating, vacuum port, liquid additive atomizer and agglomerate breaker performs most efficiently, by providing a low shear mixing action at controlled temperatures. This mixer has a flat, broad blade screw which rotates on its axis in an uplifting action, while the upper end of the axis rotates circumferentially around the top of the cone, supported from the lid. The polymer is loaded into the mixer through an entry port. Steam injected into the jacketed mixer wall warms the polymer to the desired temperature of about 130° F. (54° C.). Powdered antioxidant of 0.15 weight percent is added to the polymer and is thoroughly mixed with the polymer in an even distribution. Ethylene carbonate is first melted by raising its temperature above its melting point of 93° F. (34° C.) and added to the mixer through a liquid feed port, which atomizes the ethylene carbonate while the mixer gently lifts and exposes the polymer to the misted plasticizer. Absorption of the plasticizer is rapid and uniform assisted by the residual moisture in the polymer. Such assisted absorption causes the plasticizer to enter deeply and uniformly into each polymer particle. In the event some agglomerates occur, a lump breaker in the bottom of the mixer efficiently chops such agglomerates into a finely divided powdered form.

After dispersion of the plasticizing agent and any other desired additives, such as ultraviolet inhibitors, coloring agents, flame retardants and the like are diffused into the dry particulate blend, the vacuum port is opened while the mixing screw is still operating. Vacuum to 29 inches (73.6 cm) of mercury can be drawn, thereby lowering the boiling point of the moisture or other absorption aid within the dry blend to such level as to volatilize such moisture from the dry blend at about 125° F. (51.6° C.), leaving a residual moisture or other absorption aid content of less than one-half percent by weight. In the drying step, the level of the absorption aid or moisture level can be reduced to any desired level, e.g. 10 percent, 5 percent, or 3 percent for storage, shipping or making PAN foam, or 1 percent or 0.5 percent for film or fiber production. If the alternative plasticizing agent composed of ethylene carbonate/acetonitrile is used, the acetonitrile component is added to the polymer/ethylene carbonate dry blend after removal of the moisture from such dry blend because of the low boiling point 177° F. (80.5° C.) of acetonitrile. Such dry blends are stable for long term storage, but should be protected from significant exposure to moisture.

It has also been found that the acrylonitrile polymers and copolymers of this invention are provided with reduced thermal sensitivity by the addition of alkyl substituted N-maleimides or stilbene derivatives. This reduced thermal sensitivity enables one to dry the plasticized polymer at higher temperatures without deterioration of polymer properties. This also enables the processing of the polymer without premature increase in molecular weight.

Extrusion and pelletizing are carried out preferably in a twin screw extruder having a vacuum vent port in the barrel to evacuate any remaining moisture in the polymer melt. The action of a twin screw extruder more thoroughly compounds such dry blends in the first extruder flights, followed by a more complete mastication of the polymer melt at low shear forces, and without squeezing out any plasticizing agent from the polymer melt rearwards toward the throat of the extruder. A screw speed of 75 or more revolutions per minute in the first section of the extruder barrel prevents such liquification from forming. U.S. Pat. No. 3,991,153 discusses in detail the problem of a melt assistant escaping from the polymer dry blend in an extruder rearwards towards the feed throat, along with some melt assistant vapors. The present process prevents such occurrence due to the low moisture content and the low volatility of the other components present. Extruder barrel temperatures range from 175° F. (79° C.) to 300° F. (149° C.) from the first heat zone through the fourth heat zone. Extrudate from the extruder enters a pelletizer die forming small strands of polymer which are chilled and cut into the shape of clear pellets. Alternatively, such dry blends may be extruded directly into shaped end products.

For the production of thin films of the present invention, pellets prepared in the foregoing manner are fed into a standard single screw extruder having barrel temperature settings of 225° F. (107° C.) to 325° F. (163° C.) along a four heat zone barrel fitted with a slot sheet die having a temperature setting of 300° F. (149° C.). Die pressure is in the 400 to 500 psi range. The slot die casts a clear, tough flat web into a heated three or four roll gauge control device. The web then enters a machine direction orientation (MDO) machine consisting of a series of heated rolls, each rotating at a higher rate of speed than the preceding roll. A small amount of web stretching occurs between each roll. The rolls are positioned close to each other to minimize web "neck in". The preferred ratio of stretch is 2:1 to 4:1. By such stretching, the molecular chains are mechanically aligned to impart greater web strength.

We have discovered that as the web enters the initial heating rolls, in the MDO machine, considerable plasticizer exudes from the web. The present process employs a squeegee or air knife immediately behind the first heating rolls, directing the run-off of plasticizer into an appropriate receptacle for purification and subsequent reuse. Such mechanical plasticizer extraction and recovery from the web significantly enhances the present process because it reduces the amount of plasticizer to be removed by heat volatilization during succeeding steps of production. Machine direction orientation is carried out at 175° F. (79.4° C.) to 225° F. (107° C.), leaving about 20 weight percent residual plasticizer in the web for subsequent transverse orientation.

Following machine direction orientation, the web enters a transverse direction orientation (TDO) machine consisting of a series of preferably knurled film clips fastened to opposing sets of continuously traveling, horizontally positioned chains which travel in tracks at oblique directions from each other. This equipment is enclosed in a four or five heat zone oven where temperatures are closely controlled to comply with stretching and plasticizer volatilization requirements. The web is warmed in the first heating zones to 175° F. (79.4° C.) to 225° F. (107° C.) where stretching occurs at preferred ratios of 2:1 to 4:1, but with capability to stretch as much as 10:1. As the web is stretched, it is reduced in thickness, and is held in its final stretched position as it travels into succeedingly higher heat zones within the oven, during which time the plasticizer is volatilized from the film. The rate and volume of volatilization of the plasticizer is time and temperature dependent, thereby a desired amount of residual plasticizer may be left in such film, for possible secondary thermoplastic forming.

In the final heat zone, a temperature of 400° F. (204° C.) to 425° F. (218° C.) for a few seconds exposure volatilizes substantially all remaining plasticizer from the film. It is at this final heating stage of the present invention that chain extension and end-to-end chemical links are formed within the polymer structure as the molecular weight increases. Such chains intertwine and pack more tightly together as processing temperatures increase during film or fiber stretching, thus preventing fibrillation during such orientation steps. We have observed molecular weight increases from its original 80,000 to over 230,000 when subjected to film stretching temperatures. The presence of polar groups in such polymer increases polymer bonding, and bulkiness and arrangement of the groups influences the formation of pre-crystalline domains within the polymer structure. The molecular morphology of the polymer is believed to have a "star" configuration. It is further believed that this "star" molecule configuration and the increase in molecular weight provide greatly improved properties, i.e., tensile, dimensional stability and barrier to permeation in such end products as film or fiber.

The heat set step is followed by rapid cooling, while the film is still held in the film tenter clips to prevent shrinkage. The film edges are trimmed, the film is slit into desired roll widths and wound up on suitable roll cores.

Plasticizer vapors from the entire process are collected in overhead hoods of air flow, and ducted to a common condenser/chiller device, where it freezes into its crystalline form or condenses to its liquid form, depending on the plasticizer being used, and is subsequently purified and prepared for reuse. Any traces of unpolymerized acrylonitrile monomer within the regulatory limits remaining in the web (0.1 ppm) are volatilized along with the plasticizer and are not a part of the ambient plant air.

Film trim scrap from the present process may be finely chopped, dry blended with the plasticizing agent and extruded into pellets for re-extrusion into less demanding shaped end products, such as foam or profile extrusions. Trim scrap may also be chopped into flakes and incorporated into other polymers to create high barrier sheets and blow molded containers, wherein the scrap flakes create interacting barrier platelets to slow diffusion of gases and moisture through the wall of such containers or sheet materials.

Biaxially oriented films formed by this process provide excellent barrier to the transmission of gases and moisture, and exhibit high dimensional stability, excellent tensile strength and other mechanical properties, long term resistance to ultraviolet radiation, high resistance to fats, oils, sea and fresh water, detergents, common chemicals, hydrocarbons and many other substances. Such film has an area yield of 24,000 square inches per pound per mil (0.001 in.) thickness.

The films of this process have a wide variety of useful applications such as high barrier packaging, magnetic media substrate, surfacing for ultraviolet protection of substrates, laminating, decorating, extrusion coatings, window sunscreen, thin film solar collector designs, metalizing, electrical insulation in motor windings, pressure sensitive tapes, strapping tapes, vapor barrier films for the construction and various applications in the aircraft and automotive industries.

Foam from such polymers of the present process is made by employing residual moisture or adding other appropriate foaming agents to the dry blend mixture, extruding the dry blend directly from its powdered form through a die to form the desired shape of the foam product such as a slab, sheet, roll, "I", "T" or other profile shapes. The extrudate from the die enters a traveling mold consisting of two matching steel bands set apart from each other to the desired thickness of the slab or sheet being made, wherein the foaming agent causes internal pressure to form a cellular structure within the extrudate. The cell walls are biaxially oriented as the extrudate foam fills the mold. We have found that about 20 weight percent moisture in the dry blend creates steam which acts as a simple, harmless foaming agent. Excess plasticizing agent is removed to the extent desired by a secondary time-temperature dependent curing process. Foam may also be produced by the use of common blowing agents, such as carbon dioxide, pentane, and the like.

Fiber is produced in the present process by extruding the dry blend or pellets from such dry blend through a spinnerette to form the desired profile shape of the fiber, tensilizing the fiber by stretching to the desired ratio, and removing the plasticizing agent therefrom by mechanical means followed by volatilization of the remaining plasticizer by heat. Advantages of this process for fiber melt spinning are the ability to configure the cross-section of the fiber, the use of considerably lower volumes of plasticizer than the amount of solvents used in solution spinning, and avoidance of toxic and hazardous solvents. In addition, higher molecular weight acrylonitrile polymers may be spun into fiber in the present process than are normally used in solution spinning, because to achieve high polymer solids concentrations in spinning solutions, lower molecular weight polymers must be used. In this invention, the "star" molecular configuration as well as the molecular weight increase from heat treatment after fiber is formed is beneficial in providing improved strength properties of the fiber.

Coextrusions with other polymers in the present process, to produce shaped articles, such as containers and other profile shapes, as well as film laminates, are made by extruding the dry blend or pelletized dry blend into a feedblock coextrusion die in which the polymer melt joins with a tie coat polymer layer adjacent to the base polymer film, or in the case of containers around a hot parison melt of the structural main body polymer to form a three layered parison. The parison is then blow molded into its desired configuration as a finished shaped article or as a pre-form for later reheating and blow molding as is presently being carried out for stretch-blow molding applications. Upon blow molding, the polymer of this process as an exterior ply is biaxially oriented along with the combined layers. A distinct advantage of the present process is that the acrylonitrile polymer melt flow index can be tailored to match the requirements of the melt flow of the structural polymer by adjusting the plasticizer content during the dry blending step.

Other polymers for coextrusion can include polar polymers, such as nylon or polyethyleneterephthlate, or non-polar polymers, such as polyolefins or polyvinyl-chloride. It may be desired or necessary to use a conventional tie layer polymer with a non-polar coextruded polymer. However, if the structural or substrate polymer is polar in nature, it may be possible to eliminate the need for a tie-layer, because the PAN plasticizer may act as a direct bonding aid between the polyacrylonitrile and the polar structural polymer.

After the shaped article is made, a brief exposure to heat volatilizes the plasticizer remaining in the polymer of this process. The resulting high barrier, high tensile, polyacrylonitrile exterior ply adds hoop strength to such shaped containers, which allows for thinner-walled containers, thus reducing the amount of structural polymer required, which in turn enhances production economics. The high polarity of the polymer of this process provides an excellent surface for printing, decorating, labeling, and the like. The polyacrylonitrile exterior layer of this process reduces transmission of ultraviolet energy through the container walls, thus providing protection for ultraviolet-sensitive products.

The following examples will serve to illustrate the advantages of the present process and composition of matter of this invention.

EXAMPLE I

An acrylonitrile polymer was prepared from the following formulation and manner:

|  | Parts |
|---|---|
| (a) Water | 5100 |
| (b) Emulsifier (RE 610 GAF) | 44.63 |
| (c) Ammonium persulfate | 25.50 |
| (d) 1-dodecanethiol | 8.93 |
| (e) Acrylonitrile | 22.44 |
| (f) Butanediol-1,4-divinylether | 4.34 |
| (g) Acrylonitrile | 1248.23 |

Ingredients (a) through (d) were combined in a reactor, stirred and heated to 50° C. (122° F.) while being purged with nitrogen (N2). Ingredients (e) and (f) were added with N2 under very rapid stirring and maintained at 50° C. (122° F.) for 60 minutes. The temperature was raised to 80° C. (176° F.) for 30 minutes. Ingredient (g) was added over a 2½ hour period while maintaining 80° C. (176° F.) and stirring. Additional water was added to reduce the viscosity of the mixture. The reaction was carried out for an additional 2 hours. The reaction product was collected by vacuum filtration at 97 percent of theory, washed with water until free of emulsifier, washed in a lower aliphatic alcohol three times, followed by a final water wash and dried by centrifuge until only 15 weight percent water remained in the polymer. The polymer was a white, finely divided powder with no discernible agglomerates. Its average molecular weight was about 80,000.

Dry blends of the foregoing polymer with eight potential plasticizing agents alone or in combination with others, were screened for efficiency in reducing the melt temperature of the polymer under heat and pressure to enable polymer fusion into polymer melts. The most effective plasticizing agent was ethylene carbonate as a single component in proportions with the polymer of from 30 to 60 weight percent.

Films from the foregoing dry blends were made by pressing a small amount of dry blend between two matching, heated plates in a press. The fused plaques from the press were biaxially oriented in a stretching device resulting in films about 0.001" (1-mil) thick, clamped in a frame and heat-treated to 425° F. (218° C.) for 2 to 3 minutes to volatilize the plasticizing agent from such films. Three of the best films exhibited tensile strength of 13,400 psi to 15,560 psi. Tensile yield was 11,740 psi to 12,900 psi. Elongation was 15 to 21 percent. Variances were due to residual plasticizer in the films, which ranged from 0.1 to 1.2 percent.

EXAMPLE II

Ethylene carbonate combined with acetonitrile in proportions of from 4:1 to 2:1, respectively, dry blended with the polymer of Example I, were also effective plasticizing agents. Under lower heat and pressure than when using ethylene carbonate alone, fusion was more rapid at the outset. The higher volatility of the acetonitrile caused the acetonitrile to quickly volatilize from the plaque pressings, but the retained ethylene carbonate maintained the thermoplastic character of the fused melt. Biaxially oriented films of this Example showed similar test results as those in Example I.

EXAMPLE III

An acrylonitrile polymer of Example I was prepared, except that it was washed in a lower aliphatic alcohol two additional times, followed by two clear water rinses then centrifuged leaving about 15 weight percent moisture in the polymer. Unpolymerized acrylonitrile monomer was 0.01 parts per million, or 10 percent the allowable regulatory limits for such polymers. An antioxidant in the amount of 0.15 weight percent was dry blended with the polymer in a Prodex Henschel high speed mixer, followed by the addition of 35 weight percent ethylene carbonate.

The foregoing dry blend was fused in a corotating twin screw Baker Perkins extruder and pelletized. The pellets were re-extruded in a Davis Standard single screw extruder feeding a slot web die to form a continuous web about 0.018 inches (18 mils) thick by 12 inches wide. Such web was stretched in a machine direction orientation (MDO) machine at a ratio of 3.5 to 1. Considerable ethylene carbonate exuded from the web upon reaching stretching temperature in the initial heating rolls. A squeegee was used to direct the flow of plasticizer into an appropriate container for collection. An air knife could have also been used to avoid direct mechanical contact with the web. Such mechanical removal of some ethylene carbonate reduced the plasticizer content of the web to about 20 weight percent. The web was then stretched in the transverse direction orientation (TDO) machine inside a four heat zone oven at a ratio of 3.5 to 1, to a thickness of 0.0015 in. A final heat quench at 400° F. (204° C.) for 5 seconds reduced the residual plasticizer content to 1.2 weight percent in the film. Such film had the following properties:

| | |
|---|---|
| Tensile strength (machine direction) | 20,000 psi |
| Tensile strength (transverse direction) | 18,500 psi |
| Moisture vapor transmission in grams-mil/100 in$^2$-24 hrs. at 60% R.H. | 0.067 |
| Oxygen transmission in cc-mil/100 in$^2$-24 hrs.-atm | 0.031 |
| Carbon dioxide transmission in cc-mil/100 in$^2$-24 hrs.-atm | 0.012 |
| Fold endurance | >100,000 |
| Ultraviolet resistance (extrapolated) | 15 years |
| Molecular weight propagation to | 234,000 |

A sample of the foregoing film was especially dried of all plasticizer at 425° F. (218° C.) for 30 seconds. Its oxygen transmission value was reduced to 0.003 cc-mil/100 in$^2$-24 hrs. -atm.

EXAMPLE IV

The polymer of Example III was dry blended in a J. H. Day Nauta II conical blender fitted with a steam heating jacket, an agglomerate cutter, vacuum capability to 29 inches Hg, and an atomizing liquid feed port. Beginning polymer moisture content varied from 15 to 20 weight percent. An antioxidant in the amount of 0.15 weight percent was added to the polymer with the mixer running. Liquid ethylene carbonate at about 120° F. (49° C.) was atomized into the mixer with heat from the steam jacket maintaining a temperature of the dry blend at about 125° F. (51.6° C.). Mixer screw speed was 63 RPM as the screw axis circumferentially rotated at 2.13 RPM. After the ethylene carbonate was added and thoroughly mixed with the polymer, vacuum of 18 inches of Hg was used to reduce the moisture content in the dry blend to less than 1 weight percent. Loss of ethylene carbonate during such step was insignificant due to its relatively higher temperature of vaporization.

Such dry blend was fed into a Welding Engineers counterrotating twin screw extruder having barrel heat zone temperatures of 225° F. (107° C.), 240° F. (115.5° C.), 280° F. (137.7° C.) and 310° F. (154.4° C.) respectively, which fed a strand pelletizing die having a temperature of 290° F. (143° C.). Screw speed was 100 RPM to the devolatilization vacuum port having 15 inches Hg vacuum. Further moisture was removed through such vacuum port to leave less than 0.25 weight percent moisture in the polymer melt. High quality, uniform composition pellets with substantially all moisture removed were provided. This example illustrates that the present process can remove substantially all moisture from dry blends that can be compounded to yield uniform pellets with long term stability for extended storage prior to re-extrusion into shaped end products.

EXAMPLE V

A dry blend of the polymer of Example III was prepared, but contained 20 weight percent moisture in such dry blend. It was charged into a single screw extruder fitted with a heated slot die having an opening of 0.020 inches (0.05 cm) by 40 inches (101.6 cm) and extruded at 290° F. (143° C.). The moisture in the dry blend created steam in the web, which caused the formation of foam when the external pressure in the web was released upon exiting the die. Such foam was somewhat thicker than the die opening, and was a semi-rigid, tough sheet.

Having described the present invention by the above disclosure, illustrations, embodiments and examples, the scope of the present invention is now set forth by the following claims.

What is claimed is:

1. A method of making an extrudable polymer comprising polyacrylonitrile comprising:
   (a) forming a free-flowing particulate polymer comprising polyacrylonitrile and having from about 3 percent to about 30 percent by weight of an absorption aid therein;
   (b) mixing a liquid fugitive plasticizer with the particulate polymer wherein the amount of the plasticizer is from about 30 percent to about 50 percent based on the weight of polymer and the plasticizer is uniformly absorbed in the particulate polymer; and
   (c) removing at least a portion of the absorption aid from the particulate polymer formed in step (b)

thereby producing a free-flowing particulate polymer containing the uniformly distributed plasticizer.

2. A method according to claim 1 wherein the polyacrylonitrile polymer comprises a chain-extended polymer having a molecular weight less than about 100,000 and having a low degree of crosslinking.

3. A method according to claim 1 wherein a substantial portion of the absorption aid is removed in step (c).

4. A method according to claim 1 wherein the absorption aid comprises water or a lower aliphatic alcohol.

5. A method according to claim 1 wherein the fugitive plasticizer comprises ethylene carbonate, propylene carbonate, or acetonitrile.

6. A method according to claim 3 wherein the particulate polymer from step (c) comprises less than about 3 percent by weight water.

7. A method according to claim 6 wherein the particulate polymer from step (c) comprises less than about 0.5 percent by weight water.

8. A method according to claim 5 wherein the fugitive plasticizer comprises ethylene carbonate.

9. A method according to claim 5 wherein the fugitive plasticizer comprises propylene carbonate.

10. A method according to claim 7 further comprising:
   (d) extruding the particulate polymer from step (c) to produce film, fiber, pellets or shaped articles.

11. A method according to claim 10 wherein the extruding step produces a film.

12. A method according to claim 10 wherein a film or fiber is produced and further comprising subjecting the film or fibers to stretching and to heating at temperatures from about 175° F. to about 400° F.

13. A method according to claim 11 wherein the stretching comprises biaxial stretching.

14. A method according to claim 11 comprising at least one heating step which vaporizes residual plasticizer present in the polymer.

15. A method according to claim 11 comprising at least one heating step which increases the molecular weight of the polymer by at least about 50 percent.

16. A method according to claim 15 wherein the molecular weight increase is at least about 100 percent.

17. A method according to claim 10 wherein a film, laminate or shaped article is produced by coextruding the particulate polymer from step (c) with a substrate polymer.

18. A method according to claim 17 wherein the substrate polymer is a polar polymer capable of adhering to the extruded polymer.

19. A method according to claim 17 wherein the substrate polymer is a non-polar polymer which is adhered to the extruded polymer with a tie layer polymer.

20. A method according to claim 7 further comprising:
   (d) blow molding or thermoforming the polymer from step (c) to produce shaped articles.

* * * * *